Patented Jan. 2, 1923.

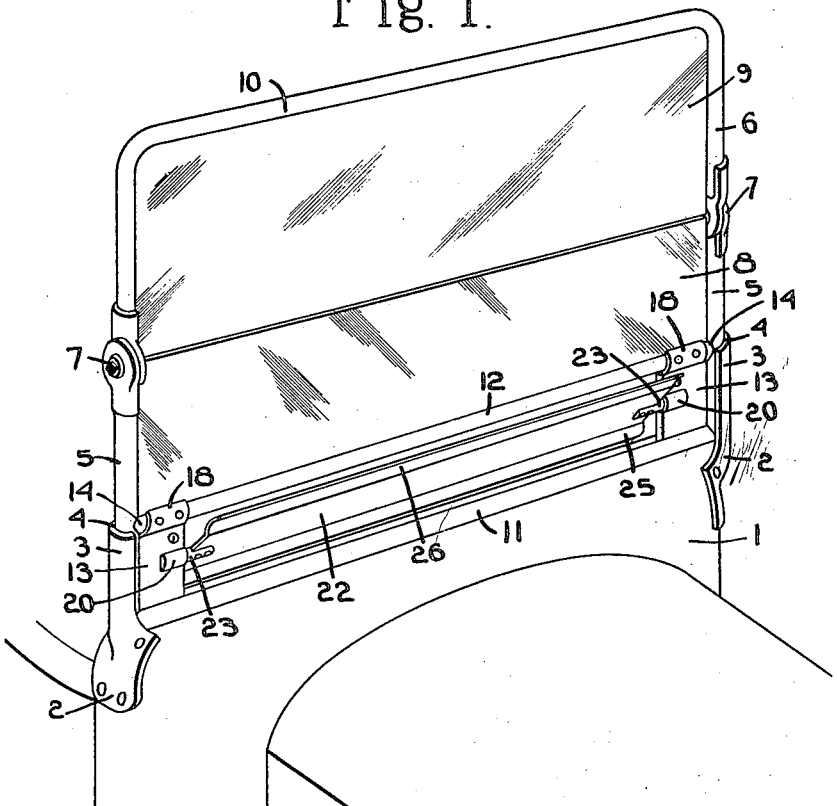
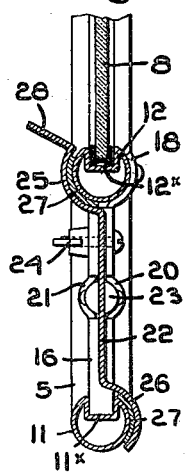
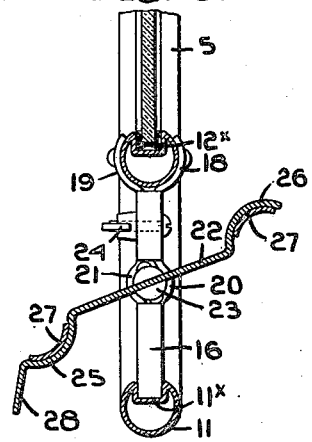
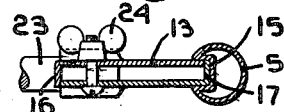
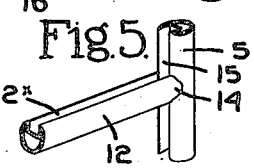
Inventor.
Jesse H. Berry

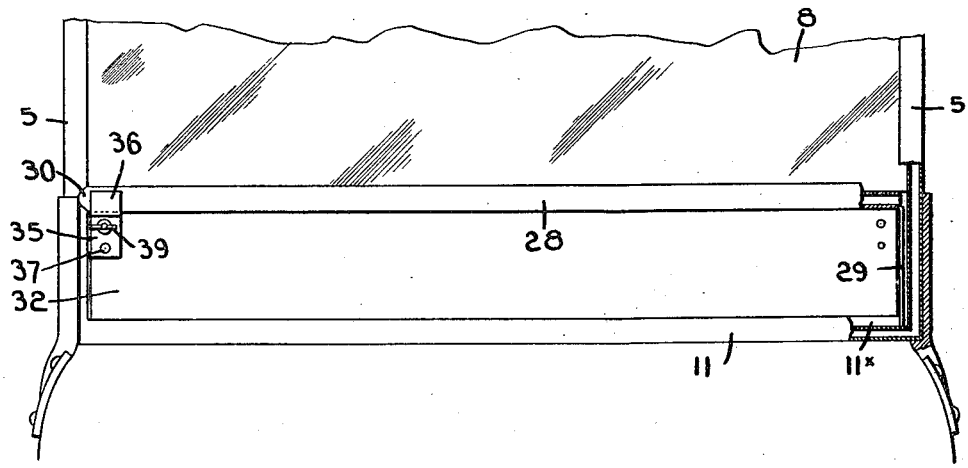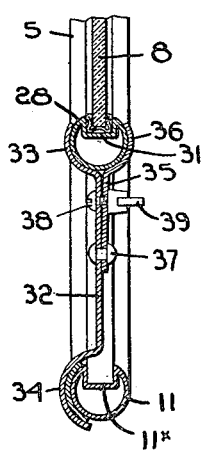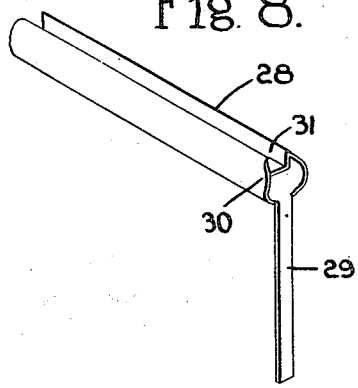

1,440,714

UNITED STATES PATENT OFFICE.

JESSE H. BERRY, OF ARLINGTON, MASSACHUSETTS.

WINDSHIELD VENTILATOR.

Application filed August 13, 1921. Serial No. 491,921.

*To all whom it may concern:*

Be it known that I, JESSE H. BERRY, a citizen of the United States, and resident of Arlington, county of Middlesex, State of Massachusetts, have invented an Improvement in Windshield Ventilators, of which the following description, in connection with the accompanying drawing, is a specification, like characters on the drawing representing like parts.

This invention relates to improvements in ventilators for the wind-shields of vehicles, particularly automobiles, in which the front portion of the body becomes heated from the engine, and the general object of the invention is to provide means for directing a current of air downwardly into the front portion of the vehicle body. More particularly the invention consists in certain improvements upon the construction disclosed in Patent No. 1,217,265, granted to me February 27, 1917.

In certain types of vehicles, particularly the automobiles of the "Ford" touring and runabout type, the transparent wind-shield, or more particularly the lower section thereof, is fixedly secured in place, whereas in the closed types of automobiles the lower section of the wind-shield is usually pivotally supported so that it can be swung inwardly at the lower edge to deflect air downwardly into the body of the vehicle.

The present invention contemplates the production of a ventilator which may be readily applied to wind-shield structures which are fixedly secured upon the dash of the vehicle.

One of the objects of the invention is to provide a ventilator which can be readily introduced without material modification of the usual wind-shield structure. The ventilator embodying my invention may be so constructed that it will fit within the usual frame which supports one of the transparent plates of the wind-shield, or it may be so constructed that it may be placed beneath the frame of the lower section of the usual wind-shield.

A further object of the invention is to provide novel means for adjustably mounting a ventilator plate so that it may be secured either in closed position or in any desired open position.

A further object of the invention is to provide a ventilator plate with means for further deflecting the air which passes through the ventilator opening.

These and other objects and features of the invention will more fully appear from the following description and the accompanying drawings and will be pointed out in the claims.

A preferred embodiment of my invention is illustrated in the drawing as applied to the wind-shield structure in the "Ford" type of open cars; but it will be understood that my invention may be employed in connection with other wind-shield mechanism for vehicles of any type to which it may be applicable.

In the drawings:

Fig. 1 is a perspective view of a portion of the front end of an automobile showing a preferred embodiment of the present invention applied to the wind-shield mechanism thereof.

Fig. 2 is a detail vertical sectional view through the lower portion of the wind-shield and its supporting frame and through the ventilator illustrated in Fig. 1, the ventilator being shown in closed position.

Fig. 3 is a detail vertical sectional view similar to Fig. 2 showing the ventilator in open position.

Fig. 4 is a detail sectional view of one of the end sections of the ventilator frame showing the same seated in one of the end members of the wind-shield frame.

Fig. 5 is a perspective view showing one of the concave ends of the ventilator frame engaging one of the end members of the wind-shield frame.

Fig. 6 is a front elevation of a modified form of the invention, a portion of the same and the wind-shield support being shown in section.

Fig. 7 is a detail vertical sectional view through the lower portion of the wind-shield and through the ventilator illustrated in Fig. 6.

Fig. 8 is a perspective view of one end of the horizontal member and one of the vertical members of the ventilator frame illustrated in Fig. 6.

In wind-shield constructions of the character illustrated in Fig. 1, the wind-shield is supported from the body or dash 1 of the vehicle or automobile by brackets 2 fixedly secured at their lower ends to the body and provided with upwardly extensions 3 having concave inner faces 4 in which the end members 5 of the lower wind-shield section are seated. The frame 6 of the upper wind-shield section usually is pivotally secured to the lower frame section 5 by joints 7. The end members 5 of the lower wind-shield frame (and also those of the upper frame) are usually formed with channels to receive respectively transparent plates 8 and 9, the end members 6 of the upper section being connected by an integral cross member 10 and the end members 5 of the lower section being connected by a transverse frame member 11. The transverse members 10 and 11, like the end members 5 and 6, are provided with grooves to receive the edges of the transparent plates 8 and 9.

In the present invention, as illustrated in Fig. 1, a ventilator is provided which can be readily substituted for a portion of one of the sections of the wind-shield. The ventilator preferably is introduced below the lower transparent wind-shield plate 8.

The ventilator illustrated in Figs. 1 to 5 of the accompanying drawings comprises a frame consisting of a transverse member 12, preferably of tubular form, having a longitudinally extending channel 12$^x$ to receive the lower edge of the transparent plate 8 of the wind-shield section, preferably so constructed as to engage the end members 5 of the wind-shield frame. The transverse member 12 preferably is provided with concave end portions 14 adapted to partially embrace and slidably fit upon the end members 5 of the wind-shield frame. The end sections of the ventilator frame are preferably in the form of plates or bars adapted to be seated in the channels 15 of the vertical end members 5 of the wind-shield frame, and also to seat within the channel in the transverse member 11 of the wind-shield frame, which usually receives the lower edge of the transparent plate 8.

In the preferred construction illustrated in Figs. 1 to 4, the end sections 13 of the ventilator frame comprise complementary plates having flanged edges 16 and 17, so assembled as to form a box-like construction. The upper portions 18 and 19 of these plates desirably are made concave to fit the tubular transverse member 12 to which they are secured by rivets or other suitable fasteners. The central portion of the plates forming the end sections desirably are provided with complementary socket portions 20 and 21, which form journals to receive the pivotal shafts or studs of the ventilator plate. The ventilator plate may be made of any suitable material; as illustrated, it is in the form of a flat metallic plate 22 having attached at its ends short stubs or shafts 23 which fit within the journals formed by the socket members 20 and 21 of the end sections of the ventilator. Thus the ventilator is pivotally mounted in said sockets. Any suitable means may be provided to clamp the ventilator plate in adjusted position. A preferred clamping means as illustrated comprises a bolt which passes through the plates forming the end sections and is provided with a wing nut 24 which, when screwed up, will force said plates toward each other and thus clamp the socket sections 20 and 21 firmly upon the studs or shafts 23, so that the ventilator may be held in any desired position. The ventilator plate 22 desirably is provided with concave edge portions 25 and 26 adapted to conform to the contour of the transverse member 12 of the ventilator frame and to the lower horizontal member 11 of the wind-shield frame respectively. Suitable strips 27 of sealing material, such as felt, may be secured within the concave sections in order to prevent the passage of air through the ventilator when the ventilator plate 22 is in closed position and also to prevent rattling. One of the edges of the ventilator plate 22 is preferably provided with a longitudinally extending flange 28 projecting at an angle to the plane of the ventilator plate 22 so that when the ventilator is swung to open position, as illustrated in Fig. 3, it will direct the air which passes through the lower portion of the opening of the ventilator abruptly downwardly toward the bottom of the vehicle body.

In order to apply the ventilator above described to a usual wind-shield frame, it is merely necessary to remove the lower transparent section 8 of the wind-shield, which may be done by merely sliding it upwardly in the channels in the frame 5 and then introducing the ventilator frame. To thus insert the ventilator frame, the outer edges of the end sections 13 are placed within the grooves 15 in the end members 5 of the wind-shield frame, and the ventilator is then slid down into the position illustrated in Fig. 1. The concave ends of the transverse member 12 of the ventilator frame closely embrace the convex surface of the frame members, while the edges of the end section 13 extend into the channels in said end members and also into the channel of the transverse member 11 of the wind-shield frame. Thus the ventilator may be quickly and firmly secured in place. A suitable portion of the transparent plate 8 is then cut off so that the upper edge thereof will be in the same position as before said transparent plate was removed, cut down, and replaced from its former position.

When the ventilator is thus assembled on the wind-shield, the plate 22 may be swung to and clamped in vertical closed position or in any angular open position. When clamped in this closed position, illustrated in Fig. 2, the sealing members 27 in the concave edge portions 25 and 26 are caused to engage respectively the inner and outer faces of the transverse member 12 of the ventilator frame and the transverse member 11 of the wind-shield frame, thus preventing the air from coming through the ventilator opening.

When it is desired to open the ventilator, the wing nut 24 is unscrewed slightly to release the clamping engagement of the socket members 20 and 21 with the studs 23. The ventilator may then be rotated to any desired open position, such for example as that illustrated in Fig. 3, whereupon the wing nut may again be screwed up tightly, thus causing the socket members 20 and 21 again to clamp the stud 23 and retain the ventilator in adjusted position.

Obviously the ventilator plate can be placed below the usual wind-shield by merely extending upwardly the brackets 2 in which the end members 5 of the usual wind-shield are seated and introducing the ventilator below the lower horizontal member of the usual wind-shield frame. In order to accomplish this purpose, it is merely necessary to lengthen the horizontal member 12 of the ventilator so that the edges of the end sections will fit within the concave portions 4 of the bracket extensions 3. In such case the lower edge of the wind-shield may rest upon the top of the transverse member 12 of the ventilator frame.

In Figs. 6, 7 and 8 a modified form of ventilator construction is illustrated, which comprises a frame having a horizontal, preferably tubular, member 28 and end members 29 adapted to enter the channels in the end members 5 of the wind-shield frame and also to be seated within the channel 11$^x$ of the lower horizontal member of the wind-shield frame 11. The end members 29 desirably are made integral with the tubular transverse member 28, but may be made separate therefrom and suitably secured within the channels in the end members 5 to support the transverse member 28 in the desired position. The ends 30 of the transverse member are desirably made concave like those of the transverse member 12, illustrated in Fig. 5 so as partially to embrace the end members 5 of the wind-shield frame. The transverse member 28 desirably is likewise provided with a channel 31 to receive the lower edge of the transparent plate 8.

In this construction the ventilator plate may be pivotally supported upon the transverse member 28 of the wind-shield frame. As illustrated herein, the ventilator plate is a sheet metal plate 32 having its upper and lower edges 33 and 34 curved to fit respectively upon the transverse member 28 of the ventilator frame and lower transverse member 11 of the wind-shield frame. A separate plate or clip 35, having a curved end portion 36 adapted to embrace the opposite side of the transverse member 28 to that embraced by the portion 33 of the ventilator plate, is secured to the plate 32 by suitable fasteners, such as rivets, 37 and a bolt 38, provided with a wing nut 39, located between the connection 37 and the curved portions 33 and 36 serve to clamp the ventilator plate 32 upon the supporting member 28.

Obviously in this construction the ventilator plate is pivotally supported upon the transverse member 28 and may be swung to any desired adjusted position and clamped in such position by merely setting up the wing nut 39. It will also be obvious that the ventilator may, with the slight modifications above suggested, be introduced below the lower section of the wind-shield. In such case, the lower section of the wind-shield will be raised in its brackets and narrowed sufficiently to fit the required space.

It will be understood that various modifications in construction and arrangement of parts may be made within the spirit and scope of the following claims, which are designed to cover any form of ventilator mechanism adapted to be introduced in the wind-shield construction of the vehicle without material modification of the original wind-shield mechanism.

Having thus described my invention, what I claim as new, and desire to secure by Letters Patent, is:

1. A wind-shield construction for vehicles comprising a transparent plate, vertical, substantially cylindrical end members having channels to receive said transparent plate, a ventilator frame comprising a transverse tubular member having a channel to receive said transparent plate and concave end portions partially embracing said cylindrical members and vertical end sections engaging said channels, a ventilator plate pivotally mounted on said frame and means for clamping said ventilator plate in adjusted positions.

2. A wind-shield construction for vehicles comprising a transparent plate, vertical, substantially cylindrical end members having channels to receive said transparent plate, a ventilator frame comprising a transverse tubular member having a channel to receive said transparent plate and concave end portions partially embracing said cylindrical members slidably mounted thereon, vertical end sections secured to said transverse tubular member engaging said channels, a ventilator plate pivotally mounted in said end sections and means for clamping said ventilator plate in adjusted positions.

3. A wind-shield construction for vehicles comprising a transparent plate, vertical end members having channels to receive the ends of said transparent plate, a ventilator frame comprising a transverse member having concave ends adapted to slidably engage said plate receiving member, vertical hollow end sections engaging said channels secured to said transverse tubular member provided with journals, the ventilator plate having shafts mounted in said journals and means for clamping said journals upon said shafts, whereby said ventilator plate may be held in adjusted positions.

4. A wind-shield construction for vehicles comprising a transparent plate, vertical end members having channels to receive the ends of said transparent plate, a ventilator frame comprising a transverse member having ends adapted to slidably engage said plate receiving members, vertical, box-like, hollow end sections engaging said channels, each comprising complementary plates having flanged edges and provided with complementary sockets forming sections of a journal, a ventilator plate having shafts seated in said journals and clamping means for drawing said plates together upon said shafts, whereby said ventilator plate may be held in adjusted positions.

5. A wind-shield construction for vehicles comprising a transparent plate, a frame for said plate comprising a horizontal member and vertical end members having channels to receive said transparent plate, a ventilator frame comprising a transverse tubular member having a longitudinal channel to receive the lower edge of said transparent plate and vertical end sections engaging said channels and having journals, a ventilator plate pivotally mounted in the journals in said end sections having sealing means adapted to engage said transverse tubular member and the lower member of the wind-shield frame when the ventilator is in closed position and a flange extending longitudinally of one edge adapted to deflect the air passing through the ventilator opening when the plate is swung to open position and means for clamping said ventilator plate in adjusted positions.

6. A ventilator for vehicle wind-shields comprising a frame having a longitudinally channeled transverse tubular member to receive the transparent plate of the wind-shield and having concave ends to partially embrace the wind-shield frame members and end sections to engage the channels in said frame members, a ventilator plate pivotally mounted on said end sections and means for clamping said ventilator plate in adjusted positions.

7. A ventilator for vehicle wind-shields comprising a frame having a longitudinally channeled transverse tubular member to receive the lower edge of the transparent plate of the wind-shield and having concave ends to partially embrace the wind-shield frame member and box-like end sections adapted to engage the channels of the wind-shield frame comprising complementary plates having flanged edges provided with sockets forming journals, a ventilator plate having shafts mounted in said journals and clamping means for drawing said plates together to clamp said journals upon said shafts, whereby said ventilator plate may be held in adjusted positions.

8. A ventilator for vehicle wind-shields comprising a frame having a longitudinally channeled transverse tubular member to receive the transparent plate of the wind-shield and end sections to engage the channels in the wind-shield frame, a ventilator plate pivotally mounted in said end sections having concave seats adapted to engage said transverse tubular member and the lower member of the wind-shield frame when the ventilator is in closed position and an angularly disposed flange extending longitudinally of one edge of said plate adapted to deflect the air passing through the ventilator opening when the plate is swung to an open position and means for clamping said ventilator plate in adjusted positions.

In testimony whereof, I have signed my name to this specification.

JESSE H. BERRY.